United States Patent
Harriman et al.

(10) Patent No.: US 6,560,666 B1
(45) Date of Patent: May 6, 2003

(54) HUB LINK MECHANISM FOR IMPEDANCE COMPENSATION UPDATE

(75) Inventors: David J. Harriman, Sacramento, CA (US); Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/449,210

(22) Filed: Nov. 23, 1999

(51) Int. Cl.[7] .................................................. G06F 1/00
(52) U.S. Cl. ........................................ 710/305; 710/310
(58) Field of Search ................................. 710/305–308, 710/310, 311, 314, 315, 29, 33, 36, 52, 58, 61; 326/83, 30, 86, 87

(56) References Cited

U.S. PATENT DOCUMENTS

| | | | | |
|---|---|---|---|---|
| 5,195,045 A | * | 3/1993 | Keane et al. | 326/83 |
| 5,644,252 A | * | 7/1997 | Watarai | 326/27 |
| 5,696,768 A | * | 12/1997 | Harriman et al. | 371/21.1 |
| 6,097,219 A | * | 8/2000 | Urata et al. | 326/83 |
| 6,145,039 A | * | 11/2000 | Ajanovic et al. | 710/105 |
| 6,212,583 B1 | * | 4/2001 | Shimura | 710/62 |

* cited by examiner

*Primary Examiner*—Mark H. Rinehart
*Assistant Examiner*—Raymond N Phan
(74) *Attorney, Agent, or Firm*—Blakely, Sokoloff, Taylor & Zafman LLP (57) ABSTRACT

A method and apparatus of performing impedance compensation on signals on interfaces between chipset components is disclosed.

In one embodiment, a present impedance adjustment value is generated, and a controlled impedance adjustment value is also established based on the present impedance adjustment value. Then a special cycle with a deterministic amount of time is generated to stabilize the interfaces. With the interfaces in a known state, the signals on the interfaces are updated with the controlled impedance adjustment value during the special cycle, where embodiment ensures the signals to be glitch-free.

27 Claims, 6 Drawing Sheets

HUB LINK MECHANISM FOR IMPEDANCE COMPENSATION UPDATE

FIELD OF THE INVENTION

This invention relates to chipset technologies generally and particularly to impedance compensation techniques.

BACKGROUND OF THE INVENTION

As integrated circuit technologies continue to advance, the frequencies at which the integrated circuits operate increase accordingly. Circuit designers often have difficulties in continuously increasing bus speeds, because input/output (hereinafter I/O) buffers connected to the buses often operate across a wide variety of operation conditions. Specifically, the performance of a buffer changes significantly over process, voltage and temperature variations. As these conditions change, the noise and response characteristics of the buffers are also affected. For stable operation, circuit designers often limit the speed at which the buffer circuits such as I/O buffers operate to accommodate the potential variations in conditions.

Alternatively, impedance compensation provides a mechanism to maintain the optimum characteristics of an I/O buffer over a wide range of operating conditions. Impedance compensation varies the output impedance of the I/O buffer to match the line impedance of a line connected to the I/O buffer. As a result, signal reflections and inter-symbol interference on the line are reduced or eliminated. This preservation of signal integrity also allows higher speed of transmission. Moreover, impedance compensation allows integrated circuit manufacturers to make on-die termination devices, which not only saves cost, but also improves reliability.

Interfaces among components in a computer system are commonly used to further improve the overall performance of the system. For the reasons detailed above, performing impedance compensation update on signals of these interfaces is often necessary to meet specified timing requirements. Traditionally, each signal on the interfaces is updated with some impedance compensation adjustment value independently to prevent glitches on the signal. As more interfaces exist and more signals travel on these interfaces, the designs for the update logic to update the signals and for the validation unit to ensure the signals to be glitch-free become complicated and, thus, costly.

Therefore, in order to simplify the designs mentioned above, a method and apparatus is needed to place interfaces in a known state, where all the signals on the interfaces can be updated at once while still maintaining the integrity of the signals.

SUMMARY OF THE INVENTION

A method and apparatus of performing impedance compensation on signals on interfaces between chipset components is disclosed.

In one embodiment, a present impedance adjustment value is generated, and a controlled impedance adjustment value is also established based on the present impedance adjustment value. Then a special cycle with a deterministic amount of time is generated to stabilize the interfaces. With the interfaces in a known state, the signals on the interfaces are updated with the controlled impedance adjustment value during the special cycle, and the signals are ensured to be glitch-free.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus of performing impedance compensation between chipset components is described. In the following description, numerous specific details are set forth, such as flip flops, logic OR gates, etc. in order to provide a thorough understanding of the present invention. However, it will be apparent to one of ordinary skill in the art that the invention may be practiced without these particular details. In other instances, well-known elements and theories such as chipset components, sideband signaling, packet-based protocol, flip flops, logic OR gates, etc. have not been discussed in special details in order to avoid obscuring the present invention.

Additionally, throughout the disclosure, the term "glitch-free" refers to not causing a transition that will be seen on any input as a change of state. In other words, when a transition occurs away from a state-switching level but does not cause a change of state, that transition is not considered as a "glitch". The term "base clock" is used interchangeably with "common clock" throughout the disclosure to refer to a clock, which is visible to both components on an impedance compensated interface.

Figure 1:
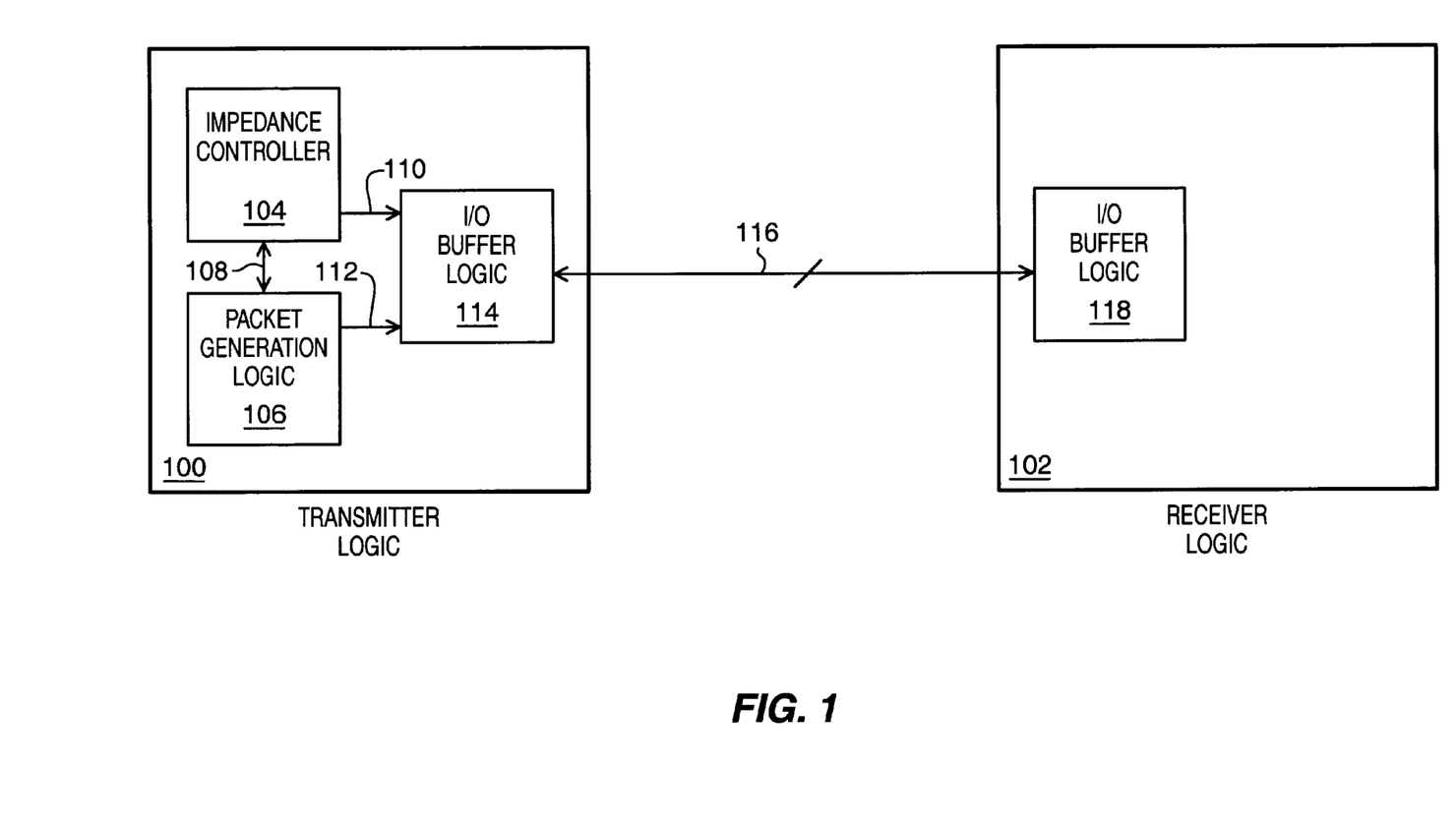
FIG. 1 illustrates a general block diagram of one embodiment of impedance compensated interface.

FIG. 1 demonstrates a general block diagram of one embodiment of an impedance compensated interface. The impedance compensated interface involves transmitter logic 100 and receiver logic 102. Transmitter logic 100 communicates with receiver logic 102 through signals on interfaces 116, where I/O buffer logic 114 and 118 are responsible for driving the signals onto and reading signals from interfaces 116. Transmitter logic 100 also contains impedance controller 104 and packet generation logic 106. Impedance controller 104 establishes appropriate impedance adjustment values, coordinates efforts to place interfaces 116 into a known state and updates the signals on interfaces 116. Packet generation logic 106 is one of the components with which impedance controller 104 communicates with through signal path 108. Details of this communication and functionality of packet generation logic 106 are discussed in subsequent paragraphs.

It should be noted that transmitter logic 100 and receiver logic 102 often reside in chipset components in an electronic system, and interfaces 116 between the two can be a hub interface. A hub interface tends to be a pin efficient and high bandwidth interface. Such an interface often eliminates some sideband signaling to achieve pin efficiency and utilizes a packet-based protocol for communications.

Figure 2:
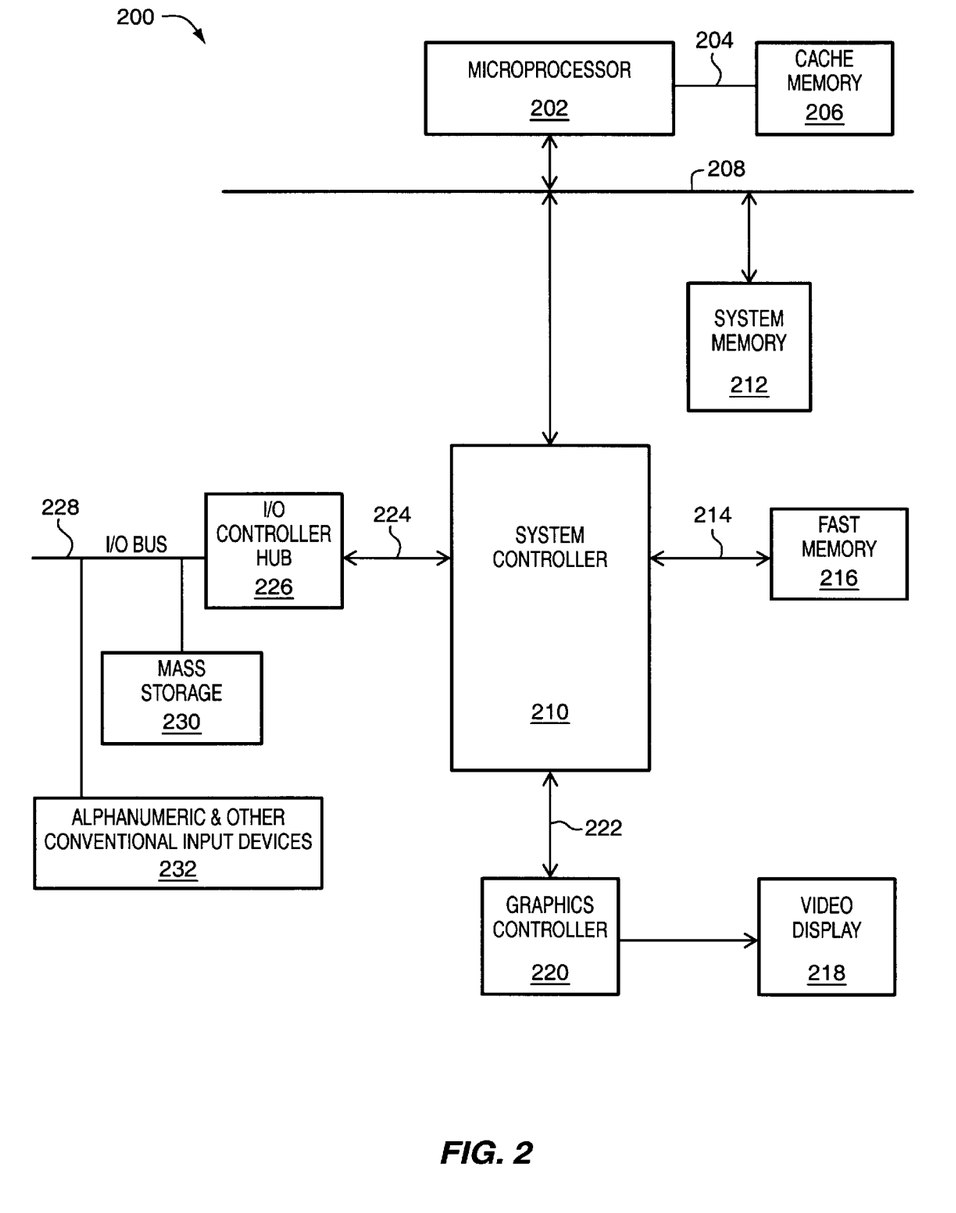
FIG. 2 illustrates a general-purpose computer system architecture.

Some examples of the electronic system are, but not limited to, standalone electronic apparatuses and general-purpose computer systems. A general-purpose computer system 200 is illustrated in FIG. 2. Additionally, interfaces 116 ordinarily include multiple electrical connections between transmitter 100 and receiver 102. These connections also have different signals travelling on them. Some examples of the signals are, but not limited to, a read request signal, a flow control signal, an error-checking signal, a data signal and a strobe signal, etc.

The general-purpose computer system architecture comprises microprocessor 202 and cache memory 206 coupled to each other through processor bus 204. Sample computer system 200 also includes high performance system bus 208 and standard I/O bus 228. Coupled to high performance system bus 208 are microprocessor 202 and system controller 210. Additionally, system controller 210 is coupled to memory subsystem 216 through channel 214, is coupled to I/O controller hub 226 through link 224 and is coupled to graphics controller 220 through interface 222. Coupled to graphics controller is video display 218. Coupled to standard I/O bus 228 are I/O controller hub 226, mass storage 230 and alphanumeric input device or other conventional input device 232. These elements perform their conventional functions well known in the art. Moreover, it should have been apparent to one ordinarily skilled in the art that computer system 200 could be designed with multiple microprocessors 202 and may have additional components or more components than that which is shown.

In one embodiment of the impedance compensated interface, transmitter logic 100 and receiver logic 102 may reside in chipset components, such as system controller 210 and I/O controller hub 226 as shown in FIG. 2.

Detailed Operation of One Embodiment of the Impedance Compensated Interface

Figure 3:
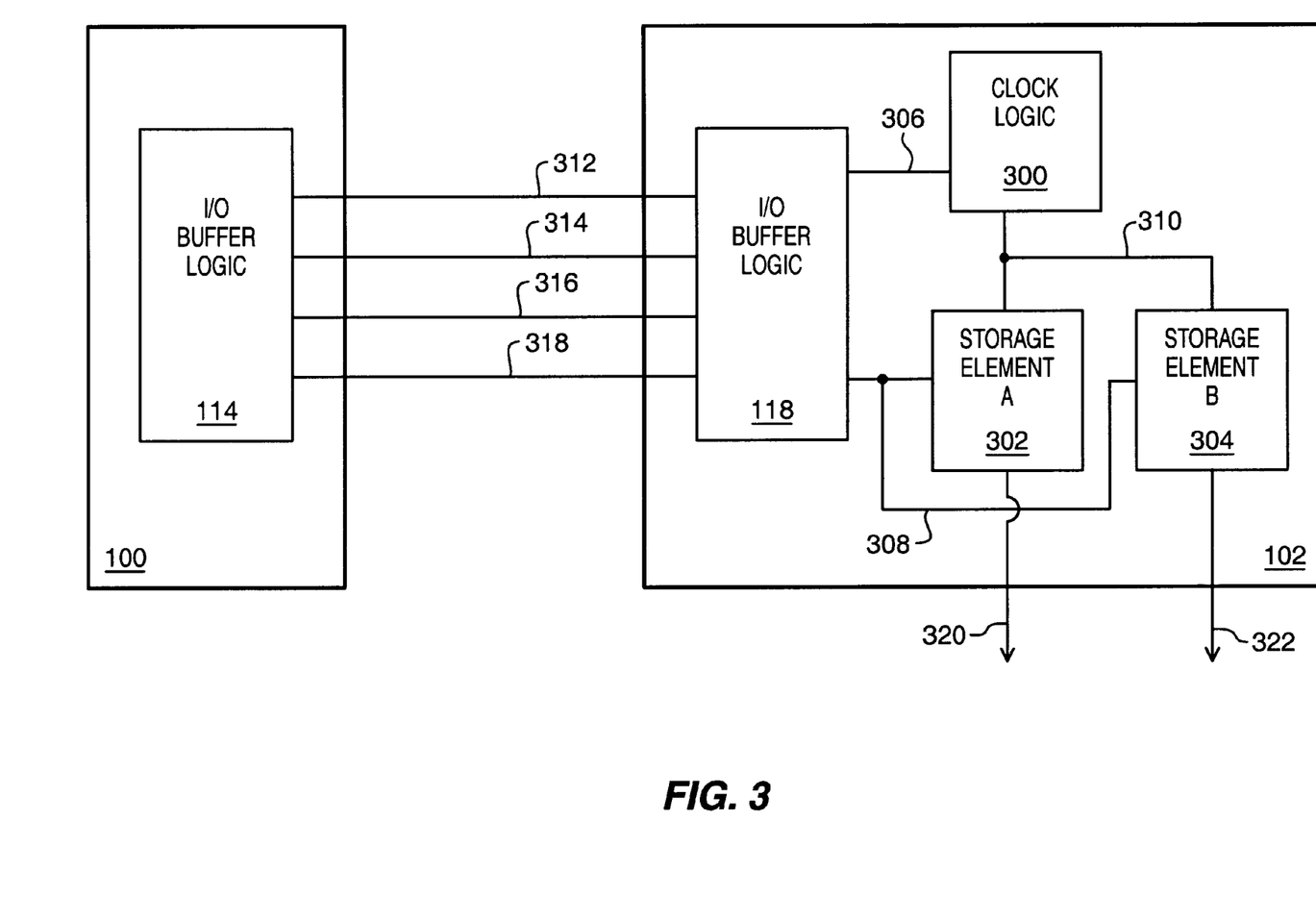
FIG. 3 illustrates a detailed block diagram of one embodiment of a receiver logic with interfaces to one embodiment of a transmitter logic.

FIG. 3 illustrates one embodiment of receiver logic 102 connected to transmitter logic 100 through certain examples of interfaces 116. The four interfaces shown in FIG. 3 carry strobe signal 312, data signal 314, flow control signal 316 and error-checking signal 318. It should be noted that interfaces 116 can carry multiple 312, 314, 316 and 318 signals and still remain within the scope of the present invention. Also, in addition to I/O buffer logic 118 already shown in FIG. 1, the embodiment of receiver logic 102 further contains clock logic 300, storage element A 302 and storage element B 304.

In one implementation of a regular data exchange between transmitter logic 100 and receiver logic 102, transmitter logic 100 sends data signal 314 to receiver logic 102. Additionally, transmitter logic 100 transmits strobe signal 312 to receiver logic 102, where the toggling of strobe signal 312 triggers storage element A 302 and storage element B 304 to store information from data signal 314.

More specifically, I/O buffer logic 118 of receiver logic 102 passes on its received strobe signal 312 to clock logic 300 through signal path 306 and places its received data signal 314 on signal path 308. When clock logic 300 detects the toggling of strobe signal 312, it asserts trigger signal 310 to storage element A 302 and/or storage element B 304. When storage element A 302 and/or B 304 receive trigger signal 310, the storage elements load data from signal path 308 into their storage locations. With data in the storage locations, other components, not shown in FIG. 3, may upload stored data from storage element A 320 and B 304 through signal paths 320 and 322, respectively. Although strobe signal 312 is acting as a transmitter clock, it should be distinguished from a base clock. More specifically, the frequency of strobe signal 312 is derived from this base clock.

In addition to strobe signal 312 and data signal 314, this embodiment of receiver logic 102 also asserts flow control signal 316 and receives error-checking signal 318 during the previously mentioned regular data exchange. Receiver logic 102 asserts flow control signal 316, whenever it attempts to throttle the amount of data received from transmitter logic 100. In one embodiment, when transmitter logic 100 utilizes pipelining in its design and receives the asserted flow control signal 316, transmitter logic 100 flushes previously transmitted packets in its pipeline.

Moreover, transmitter logic 100 may send error-checking signal 318, such as a parity signal, to allow receiver logic 102 to verify the integrity of its received data during the regular data exchange. It should be emphasized that although specific signals on interfaces 116 have been discussed in detail, one ordinarily skilled in the art can add or delete a number of signals to facilitate the regular data exchange without exceeding the scope of the disclosed transmitter logic and receiver logic. For example, in one embodiment, error-checking signal 318 can be eliminated. In another embodiment, a number of arbitration signals, which are typically used for framing packets and for regulating transmission sequences, can be added.

In view of the regular data exchange described previously, FIG. 4 demonstrates a process which one embodiment of transmitter logic 100 and receiver logic 102 follows before updating signals on interfaces 116 shown in FIG. 1. In conjunction with FIG. 1, the embodiment begins the process with block 400, where impedance controller 104 of transmitter logic 100 establishes an appropriate amount of time for a special cycle. In one implementation, this deterministic amount of time should be sufficient to safely perform impedance compensation update. In other words, during this period of time, carrying out the impedance compensation update neither jeopardizes the integrity of the signals on interfaces 116, nor does it confuse and disrupt operations of receiver logic 102.

Figure 4:
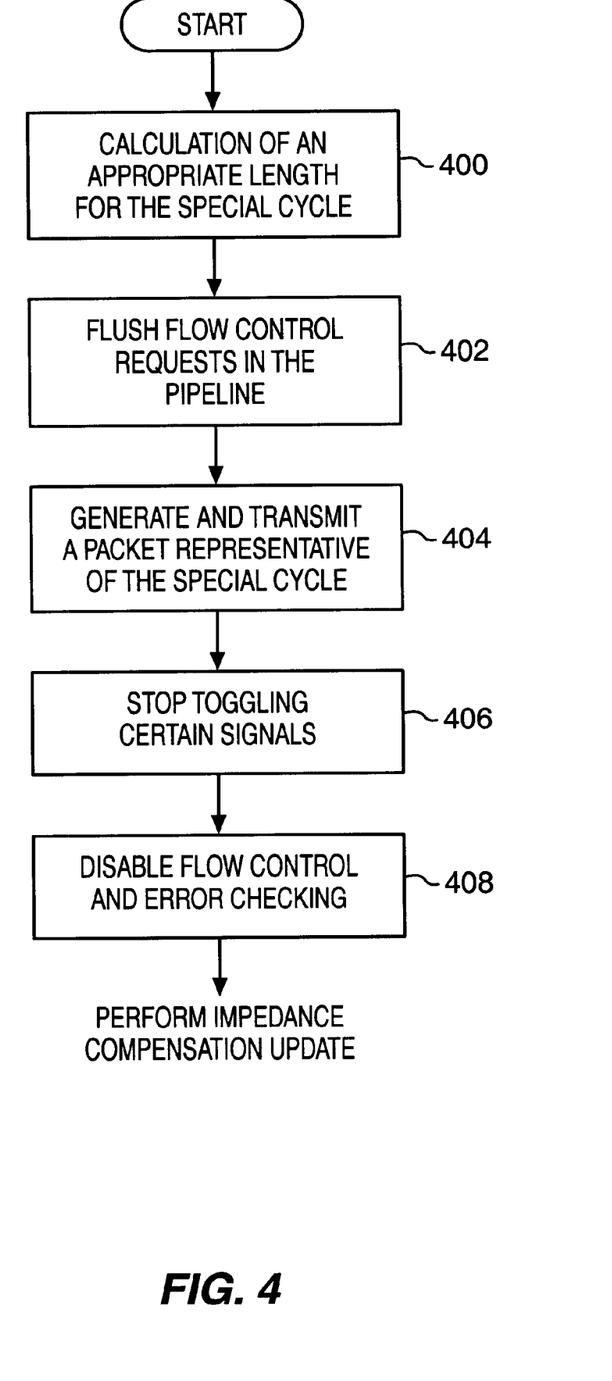
FIG. 4 illustrates a process which one embodiment of a transmitter logic and one embodiment of a receiver logic follow before performing impedance compensation update.

In block 404, impedance controller 104 signals packet generator logic 106 through signal path 108 to generate a packet representative of a special cycle. For example, packet generator logic 106 may generate a packet with some header information indicative of this special cycle and with an appropriate amount of data representative of the amount of time calculated in block 400. This amount of data is also referred to as the "data phase" of the special cycle. Transmitter logic 100 transmits this packet to receiver 102 to place interfaces 116 into known states, where certain restrictions are imposed upon both transmitter logic 100 and receiver logic 102.

One of the restrictions is to disallow flow control during the data phase of the special cycle. As has been discussed previously, in one embodiment, when transmitter logic 100 pipelines its own outgoing packets and requests from receiver logic 102, a flow control request from receiver logic 102 causes transmitter logic 100 to flush its pipeline. Thus, if an outgoing packet for starting the special cycle is in the pipeline at the time a flow control request is received, then transmitter logic 100 may unknowingly flush the packet. In order to guard against this situation, this embodiment has block 402, which flushes any flow control requests in the pipeline before transmitter logic 100 transmits the special cycle packet. Although this particular sequence of blocks 400–402–404 has been discussed, it should be apparent to one ordinarily skilled in the art to rearrange the sequence without exceeding the scope of the disclosed process. For instance, packet generation logic 106 may instead generate the special packet in box 400, or box 402 may swap with box 400 in sequence.

Referring to FIG. 3, one embodiment of transmitter 100 proceeds to stop toggling strobe signal 312 and data signal 314 in box 406. During the data phase of the special cycle, transmitter 100 suspends the previously described regular data exchange. Consequently, clock logic 300 does not assert trigger signal 310 and storage elements A 302 and B 304 do not load information from data signal 314 into their respectively storage locations. However, in one embodiment of receiver logic 102, the two storage elements lack the intelligence to recognize that they no longer receive new data. Instead, they read data, which have already been stored previously, during the data phase of the special cycle.

In order to maintain the correct receiver buffer alignment for the data phase of the special cycle (when strobe signal 312 does not toggle), one embodiment of transmitter logic 100 determines the number of base clock cycles, C. C corresponds to the number of base clock cycles which would be required to exactly fill all the storage elements in the receiver logic 102 some integer number of times. Assuming S represents the total number of storage elements in receiver logic 102 and assuming E represents the number of those storage elements which are normally used to receive one base clock cycle worth of data, then the number of base clock cycles for the special cycle data phase can be defined as $$C = N*(S/E)$$

where N is some integer. Using receiver logic 102 shown in FIG. 3 as an example, S is two, E equals one, so C is equal to (N*2). It should be apparent to one ordinarily skilled in the art to design receiver logic 102 with any number of storage elements as long as the design maintains the described mathematical relationship.

In block 408, flow control and error-checking are disabled. In addition to flushing flow control requests as discussed in block 402, one embodiment of receiver logic 102 also stops sending flow control requests to transmitter logic 100, or in other words, disallows asserting flow control signal 316 during the data phase of the special cycle. Furthermore, one embodiment of receiver logic 102 disables its error-checking mechanism. In the embodiment, receiver logic 102 ignores error-checking signal 318 from transmitter logic 100 during the data phase of the special cycle. Thus, transmitter logic 100 does not need to drive error-checking signal 318 to predetermined states.

Figure 5:
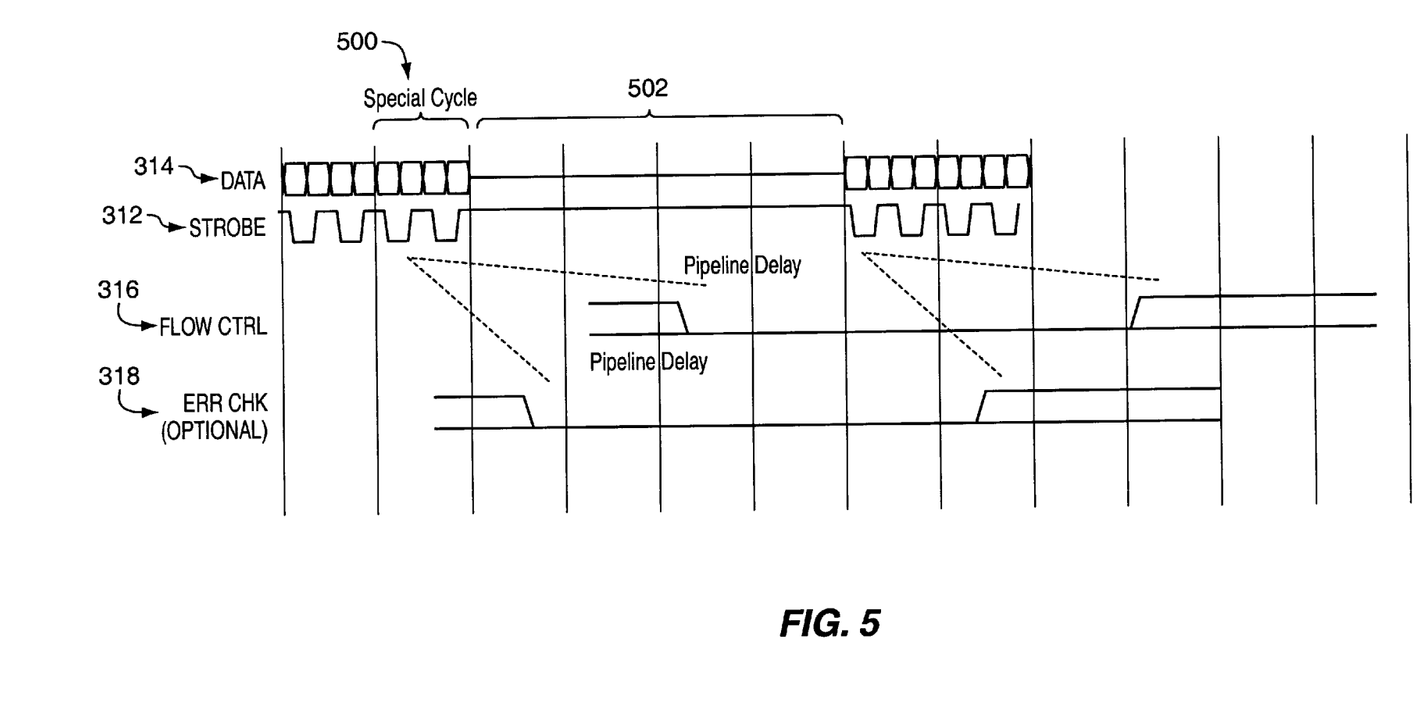
FIG. 5 illustrates a timing diagram of some examples of signals on interfaces between one embodiment of a transmitter logic and one embodiment of a receiver logic.

FIG. 5 provides a timing diagram to further reiterate the timing relationships among the four signals, namely, strobe signal 312, data signal 314, flow control signal 316 and error-checking signal 318. Cycle 500 signifies the beginning of the packet representative of the special cycle. Period 502 represents the data phase of the special cycle. As has been disclosed previously, strobe signal 312 stops toggling during period 502. Flow control signal 316 and error-checking signal 318 are both deasserted immediately before cycle 500 and remains inactive for the duration of period 502. However, it should be emphasized that FIG. 5 illustrates one possible state for error-checking signal 318 during period 502. As has been previously discussed, error-checking signal 318 does not need to be in a particular state during period 502. FIG. 5 also illustrates the effects of pipeline delays associated with signals 316 and 318.

One embodiment of transmitter logic 100 proceeds to update signals on interfaces 116 with impedance adjustment values from impedance controller 104 during period 502. More particularly, in conjunction with FIG. 1, impedance controller 104 instructs I/O buffer logic 114 how strongly to pull the signals high or low through interface 110 based on the impedance adjustment values. Furthermore, in order to prevent glitches on these signals, one embodiment of impedance controller 104 also establishes a controlled impedance adjustment value based on a previous impedance value and a present impedance value. The controlled impedance adjustment value is intended to cause I/O buffer logic 114 to drive the signals on interfaces 116 strongly in the direction already is being driven, and away from a transition point where a logical value would change. For example, if an output from I/O buffer logic 114 has as a "100" binary value and is active high, acceptable transition values represented by 3 binary bits should be able to cause the output to be stronger than "100". These transition values thus are: "101", "110" and "111".

Figure 6:
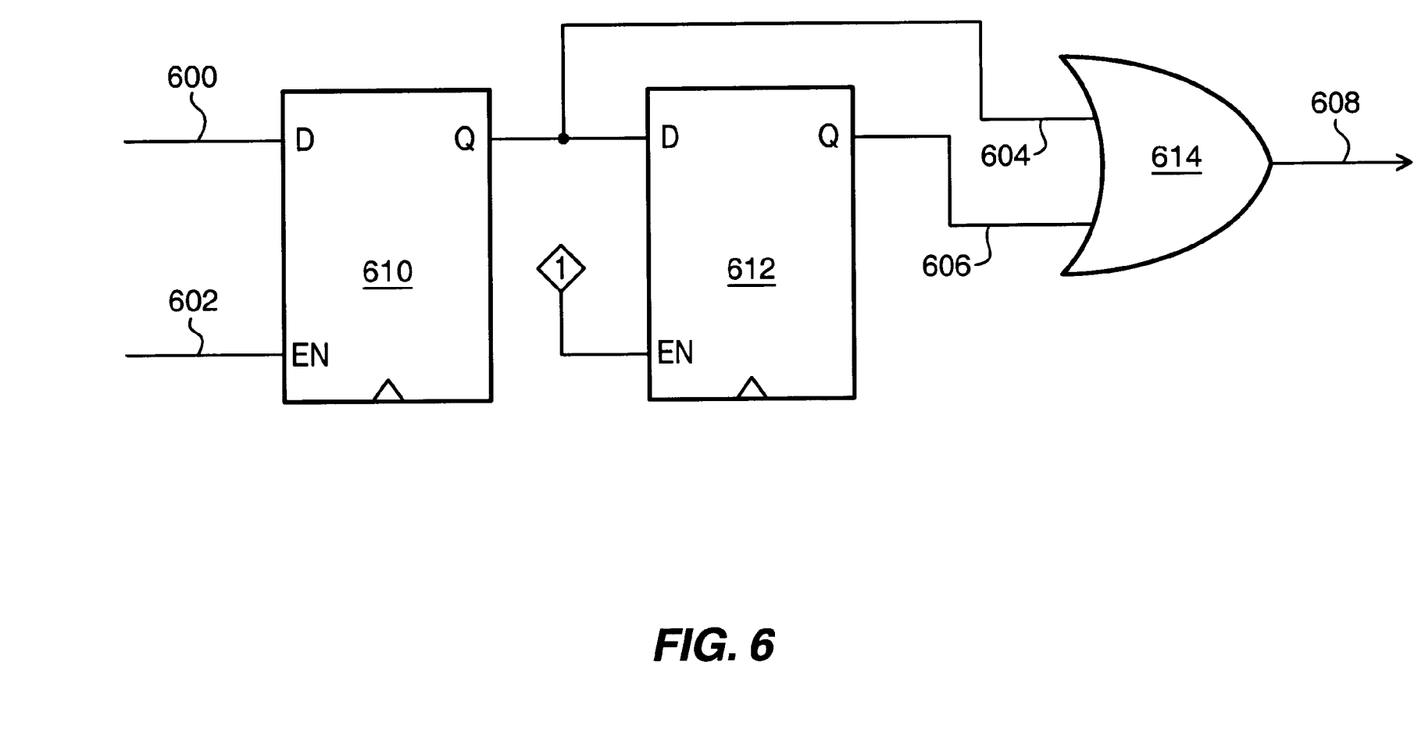
FIG. 6 illustrates one signal update mechanism, which ensures updated signals to be glitch-free.

FIG. 6 illustrates one mechanism which impedance controller 104 employs to generate such a controlled impedance adjustment value. In particular, the mechanism comprises two flip flops, 610 and 612 and a logical OR gate 614. Flip flop 612 is always enabled. When impedance controller 104 enables flip flop 610 to update through signal 602, flip flop 610 clocks in impedance adjustment value 600 and flip flop 612 clocks in output of flip flop 610. Flip flops 610 and 612 use the same clock, and the clock is typically the base clock. Consequently, inputs of logical OR gate 614 are present impedance adjustment value 604 and previous impedance adjustment value 606 indicative of the sequential relationship between the two values. Output of logical OR gate 614 is then controlled impedance adjustment value 608.

Although the preceding paragraphs discuss in details a specific mechanism to prevent signal glitches, it should be apparent to one ordinarily skilled in the art to either apply a different method or to implement the mechanism outside of impedance controller 104 without exceeding the scope of the disclosed impedance controller 104. For example, the method shown in FIG. 6 can be part of I/O buffer logic 114.

Thus, a method and apparatus of performing impedance compensation between chipset components has been disclosed. Although the disclosure has particular references to the figures, the disclosure may appear in any number of systems, which provide the capability of stabilizing interfaces between chipset components and performing impedance compensation update without causing signal glitches. It is further contemplated that many changes and modifications may be made by one of ordinary skill in the art without departing from the spirit and scope of the disclosure.

What is claimed is:

1. A method for performing impedance compensation on signals on a plurality of interfaces comprising:

establishing a present impedance adjustment value;

flushing existing requests for flow control;

generating a special cycle with a deterministic amount of time to stabilize the interfaces; and updating the signals with a controlled impedance adjustment value based on the present impedance adjustment value during the special cycle and ensuring the signals are glitch-free.

2. The method according to claim 1, wherein generating a special cycle with a deterministic amount of time to stabilize the interfaces further comprises:

generating a data packet indicative of a data phase of the special cycle and with a data length that corresponds to the deterministic amount of time;

blocking regular data exchange by disabling a strobe signal during the data phase of the special cycle;

disabling error-checking during the data phase of the special cycle; and disabling flow control during the data phase of the special cycle.

3. The method according to claim 2, wherein the regular data exchange in further comprises:

transmitting data on a data bus and toggling the strobe signal; and capturing and storing data from the data bus when receiver logic detects an edge of the strobe signal.

4. The method according to claim 3, wherein the receiver logic further comprises a number of storage elements, and transmitter logic further generates a number of cycles of a base clock signal to fill the storage elements an integer number of times during the data phase of the special cycle.

5. The method according to claim 4, wherein the receiver logic reads data only from the storage elements during the data phase of the special cycle.

6. The method according to claim 1, wherein the controlled impedance adjustment value is established by logically ORing the present impedance adjustment value and a previous impedance adjustment value.

7. An apparatus comprising:

transmitter logic comprising:

an impedance controller to establish a present impedance adjustment value and a controlled impedance adjustment value based on the present impedance adjustment value; and packet generation logic, coupled to the impedance controller, to generate a special cycle with a deterministic amount of time to stabilize the interfaces;

receiver logic coupled to the transmitter logic through signals on a plurality of interfaces; and Input/Output (I/O) buffer logic, coupled to the impedance controller, packet generation logic and the interfaces, to update the signals with the controlled impedance adjustment value during the special cycle.

8. The apparatus according to claim 7, wherein the transmitter logic further flushes existing requests for flow control before generating the special cycle when the existing requests are pipelined.

9. The apparatus according to claim 8, wherein the packet generation logic further comprises generating a data packet indicative of a data phase of the special cycle and with a data length that corresponds to the deterministic amount of time.

10. The apparatus according to claim 8, wherein the transmitter logic further blocks regular data exchange between the transmitter logic and the receiver logic by disabling a strobe signal during the data phase of the special cycle.

11. The apparatus according to claim 10, wherein the receiver logic further disables error-checking during the data phase of the special cycle; and disallows to issue flowing control requests during the data phase of the special cycle.

12. The apparatus according to claim 9, wherein the regular data exchange further comprises:

the transmitter logic to transmit data on a data bus and toggling the strobe signal; the receiver logic to capture and store data from the data bus when the receiver logic detects an edge of the strobe signal.

13. The apparatus according to claim 12, wherein the receiver logic further comprises a number of storage elements, and the transmitter logic further generates a number of cycles of a base clock signal to fill the storage elements an integer number of times during the data phase of the special cycle.

14. The apparatus according to claim 13, wherein the receiver logic reads data only from the storage elements during the data phase of the special cycle.

15. The apparatus according to claim 7, wherein the impedance controller logically Ors the present impedance adjustment value and a previous impedance adjustment value to establish the controlled impedance adjustment value.

16. The apparatus according to claim 15, wherein the I/O buffer logic utilizes the controlled impedance adjustment values to ensure signals on the interfaces are glitch-free.

17. An electronic system comprising:

a first chipset component; and a second chipset component, coupled to the first chipset component through signals on a plurality of interfaces, wherein the first and the second chipset components comprise:

transmitter logic that comprises:

an impedance controller to establish a present impedance adjustment value and a controlled impedance adjustment value based on the present impedance adjustment value; and packet generation logic, coupled to the impedance controller, to generate a special cycle with a deterministic amount of time to stabilize the interfaces;

receiver logic; and

Input/Output (I/O) buffer logic, coupled to the impedance controller, packet generation logic and the interfaces, to update the signals with the controlled impedance adjustment value during the special cycle.

18. The electronic system according to claim 17, wherein the transmitter logic further flushes existing requests for flow control before generating the special cycle when the existing requests are pipelined.

19. The electronic system according to claim 18, wherein the packet generation logic further comprises generating a data packet indicative a data phase of the special cycle and with a data length that corresponds to the deterministic amount of time.

20. The electronic system according to claim 18, wherein the transmitter logic further blocks regular data exchange between the transmitter logic and the receiver logic by disabling a strobe signal during the data phase of the special cycle.

21. The electronic system according to claim 20, wherein the receiver logic further disables error-checking during the data phase of the special cycle; and disallows to issue flowing control requests during the data phase of the special cycle.

22. The electronic system according to claim 20, wherein the regular data exchange further comprises:

the transmitter logic to transmit data on a data bus and toggling the strobe signal; and the receiver logic to capture and store data from the data bus when the receiver logic detects an edge of the strobe signal.

23. The electronic system according to claim 22, the receiver logic further comprises a number of storage elements, and the transmitter logic further generates a number of cycles of a base clock signal to fill the storage elements an integer number of times during the data phase of the special cycle.

24. The electronic system according to claim 23, wherein the receiver logic reads data only from the storage elements during the data phase of the special cycle.

25. The electronic system according to claim 17, wherein the impedance controller logically Ors the present impedance adjustment value and a previous impedance adjustment value to establish the controlled impedance adjustment value.

26. The electronic system according to claim 25, wherein the I/O buffer logic utilizes the controlled impedance adjustment values to ensure signals on the interfaces are glitch-free.

27. An electronic system according to claim 17, further comprising:

a system bus coupled to the first chipset component; and a microprocessor coupled to the system bus.

* * * * *